United States Patent
Prakash et al.

(10) Patent No.: US 11,816,538 B2
(45) Date of Patent: Nov. 14, 2023

(54) METHODS FOR EFFICIENT IMPLEMENTATION OF UNITARY OPERATORS IN THE CLIFFORD ALGEBRA AS QUANTUM CIRCUITS AND APPLICATIONS TO LINEAR ALGEBRA AND MACHINE LEARNING

(71) Applicant: QC Ware Corp., Palo Alto, CA (US)

(72) Inventors: Anupam Prakash, Palo Alto, CA (US); Iordanis Kerenidis, Paris (FR)

(73) Assignee: QC Ware Corp., Palo Alto, CA (US)

( * ) Notice: Subject to any disclaimer, the term of this patent is extended or adjusted under 35 U.S.C. 154(b) by 229 days.

(21) Appl. No.: 17/244,362

(22) Filed: Apr. 29, 2021

(65) Prior Publication Data
US 2023/0153671 A1    May 18, 2023

(51) Int. Cl.
   *G06N 10/20*    (2022.01)

(52) U.S. Cl.
   CPC ................. *G06N 10/20* (2022.01)

(58) Field of Classification Search
   CPC .................................................. G06N 10/20
   See application file for complete search history.

(56) References Cited

U.S. PATENT DOCUMENTS

| | | |
|---|---|---|
| 2003/0011398 A1 | 1/2003 | Herr |
| 2014/0280427 A1 | 9/2014 | Bocharov et al. |
| 2019/0213493 A1 | 7/2019 | Cortese et al. |
| 2020/0320240 A1 | 10/2020 | Parrish et al. |

FOREIGN PATENT DOCUMENTS

WO    WO 2020/010208 A1    1/2020

OTHER PUBLICATIONS

Calderer et al., Quantum Unary Approach to Option Pricing, Jul. 2020. (Year: 2020).*
Foxen et al., Demonstrating a Continuous Set of Two-Qubit Gates for Near-Term Quantum Algorithms, Feb. 2020. (Year: 2020).*
Johri, S. et al., "Nearest Centroid Classification on a Trapped Ion Quantum Computer," arXiv:2012.04145v2, Dec. 9, 2020, pp. 1-15.
PCT Invitation to Pay Additional Fees, PCT Application No. PCT/US21/53653, dated Dec. 8, 2021, two pages.
PCT International Search Report and Written Opinion, PCT Application No. PCT/US21/53653, dated Feb. 4, 2022, 19 pages.
Dereziński, M. et al., "Determinantal Point Processes in Randomized Numerical Linear Algebra," arXiv:2005.03185, May 7, 2020, 18 pages.
U.S. Appl. No. 16/986,553, filed Aug. 6, 2020, Inventor Iordanis Kerenidis.
U.S. Appl. No. 16/987,235, filed Aug. 6, 2020, Inventor Iordanis Kerenidis.

* cited by examiner

*Primary Examiner* — Marshall L Werner
(74) *Attorney, Agent, or Firm* — Fenwick & West LLP

(57) ABSTRACT

This disclosure relates to methods of constructing efficient quantum circuits for Clifford loaders and variations of these methods following a similar scheme.

20 Claims, 4 Drawing Sheets

METHODS FOR EFFICIENT IMPLEMENTATION OF UNITARY OPERATORS IN THE CLIFFORD ALGEBRA AS QUANTUM CIRCUITS AND APPLICATIONS TO LINEAR ALGEBRA AND MACHINE LEARNING

BACKGROUND

Technical Field

This disclosure is in the field of quantum algorithms and quantum linear algebra. In particular, it provides a logarithmic depth construction for quantum circuits that are referred to as Clifford loaders. This disclosure is also in the field of quantum machine learning. In particular it provides applications to quantum machine learning of the Clifford loader circuits.

Description of Related Art

Determinant sampling with classical computers is computationally expensive as the complexity of computing the determinant of a single d dimensional matrix scales as $O(d^3)$. In theory, there are complex theoretical constructions which can achieve $O(d^{2.37})$ for computing a single determinant but these can only outperform the standard method for very large d due to their large constant factor overheads. Moreover, most classical determinant sampling algorithms need to compute several determinants leading to even higher computa-tional requirements.

SUMMARY

This disclosure provides a logarithmic depth construction for quantum circuits that are referred to as Clifford loaders. The circuits implement certain unitary operations in the Clifford algebra and have applications to quantum linear algebra and quantum machine learning. The circuits constructed are optimized in terms of the number of qubits, depth of quantum circuit, and type of gates in the circuit.

Quantum machine learning and linear algebra algorithms may depend on the ability to represent classical data as quantum states in order to use quantum procedures for linear algebra tasks. The disclosure gives procedures to efficiently represent subspaces spanned by k-vectors as quantum states using Clifford loaders. The embodiments of the disclosure have applications to quantum machine learning, for example, for the tasks of determinant sampling and topological data analysis and to quantum linear algebra, for example, for projection and solution of low dimensional linear systems.

Some embodiments relate to a quantum circuit for execution by a quantum computer, the quantum computer including at least N qubits $q_n$. The quantum circuit includes first and second sub-circuits and a gadget circuit. The first sub-circuit includes quantum gates that are applied to N/2 qubits $q_1-q_{N/2}$, where, subsequent to execution of the first sub-circuit, a value of qubit $q_2$ represents a parity of qubits $q_2-q_{N/2}$. The second sub-circuit is arranged to be executed concurrently with the first sub-circuit and includes quantum gates that are applied to N/2 qubits $q_{(N/2+1)}-q_n$. The gadget circuit is arranged to be executed after the first and second sub-circuits. The gadget circuit includes quantum gates that are applied to qubits $q_1$, $q_2$, and $q_{(N/2+1)}$, where one of the quantum gates of the gadget circuit is a BS($\theta$) gate. The BS($\theta$) gate is a single parameterized 2-qubit quantum gate. If the value of qubit $q_2$ is 0, then the gadget circuit applies the BS($\theta$) gate to qubits $q_1$ and q(N/2+1). If the value of qubit $q_2$ is 1, then the gadget circuit instead applies a conjugate of the BS($\theta$) gate to qubits $q_1$ and $q_{(N/2+1)}$.

In some embodiments, the first sub-circuit includes a third sub-circuit, a fourth sub-circuit, and a second gadget circuit. The third sub-circuit includes quantum gates that are applied to N/4 qubits $q_1-q_{N/4}$, wherein, subsequent to execution of the third sub-circuit, the value of qubit $q_2$ represents a parity of qubits $q_2-q_{N/4}$. The fourth sub-circuit arranged to be executed concurrently to the third sub-circuit and comprises quantum gates that are applied to N/4 qubits $q_{(N/4+1)}-q_{N/2}$. The second gadget circuit is after the third and fourth sub-circuits. The second gadget circuit comprises quantum gates that are applied to qubits $q_1$, $q_2$, and $q_{(N/4+1)}$, where one of the quantum gates of the second gadget circuit is a second BS($\theta$) gate. If the value of qubit $q_2$ is 0, the second BS($\theta$) gate is applied to qubits $q_1$ and $q_{(N/4+1)}$, and if the value of qubit $q_2$ is 1, a conjugate of the second BS($\theta$) gate is applied to qubits $q_1$ and $q_{(N/4+1)}$.

In some embodiments, the quantum circuit further includes an X gate applied to qubit $q_1$ after the gadget circuit. In some embodiments, the quantum circuit further includes a second gadget circuit after the X gate. The second gadget circuit comprises quantum gates that are applied to qubits $q_1$, $q_2$, and $q_{(N/2+1)}$, where one of the quantum gates of the second gadget circuit is a second BS($\theta$) gate. If the value of qubit $q_2$ is 0, a conjugate of the BS($\theta$) gate is applied to qubits $q_1$ and $q_{(N/2+1)}$, and if the value of qubit $q_2$ is 1, the BS($\theta$) gate is applied to qubits $q_1$ and $q_{(N/2+1)}$. In some embodiments, the quantum circuit further includes a third sub-circuit after the second gadget circuit. The third sub-circuit comprises quantum gates that are applied to N/2 qubits $q_1-q_{N/2}$, where the quantum gates of the third sub-circuit match the quantum gates of the first sub-circuit except the quantum gates of the third sub-circuit are arranged in reverse order and the BS($\theta$) gates are conjugated. In some embodiments, the quantum circuit further includes a fourth sub-circuit arranged to be executed concurrently to the third sub-circuit. The fourth sub-circuit comprises quantum gates that are applied to N/2 qubits $q_{(N/2+1)}-q_N$, where the quantum gates of the fourth sub-circuit match the quantum gates of the second sub-circuit except the quantum gates of the fourth sub-circuit are arranged in reverse order and the BS($\theta$) gates are conjugated.

In some embodiments, the quantum circuit further includes a first layer that applies a second BS($\theta$) gate to qubits $q_1$ and $q_2$ and a third BS($\theta$) gate to qubits $q_3$ and $q_4$; a second layer that applies a first CZ gate to qubits $q_1$ and $q_2$, where the CZ gate is a controlled Z gate; a third layer that applies a fourth BS($\theta$) gate to qubits $q_1$ and $q_3$; a fourth layer that applies a second CZ gate to qubits $q_1$ and $q_2$ and a first CX gate to qubits $q_3$ and $q_4$, where the CX gate is a controlled X gate; and a fifth layer that applies a second CX gate to qubits $q_2$ and $q_3$.

In some embodiments, the gadget sub-circuit comprises: a first layer that applies a first CZ gate to qubits $q_1$ and $q_2$, where the CZ gate is a controlled Z gate; a second layer that applies the BS($\theta$) gate to qubits $q_1$ and $q_{(N/2+1)}$; and a third layer that applies a second CZ gate to qubits $q_1$ and $q_2$.

Some embodiments relate to quantum circuit for execution by a quantum computer. Note that the following circuit includes nested sub-circuits. The quantum circuit includes N qubits $q_n$, with $N=2^k$ and $K \geq 2$, and K recursive circuit levels $k=1$ to K. Each circuit level k includes $(N/2^k)$ level-k circuits, and each level-k circuit includes one or more quantum gates applied to $2^k$ of the qubits $q_n$. The $2^k$ qubits for each level-k circuit include a first qubit and a second qubit for that level-k circuit. Each level-1 circuit includes a BS gate applied to two of the qubits $q_n$, where one of the two qubits is the first qubit of the level-1 circuit and the other of the two qubits is the second qubit of the level-1 circuit. Each level-k circuit for k≥2 includes one of the level-(k−1) circuits as a first sub-circuit, another of the level-(k−1) circuits as a second sub-circuit, and a gadget circuit comprising a BS gate. If the value of the second qubit of the first sub-circuit is 0, the gadget circuit applies the BS gate to the first qubit of the first sub-circuit and the first qubit of the second sub-circuit. If the value of the second qubit of the first sub-circuit is 1, the gadget circuit applies the conjugate of the BS gate to the first qubit of the first sub-circuit and the first qubit of the second sub-circuit.

Some embodiments relate to a quantum circuit for execution by a quantum computer, the quantum computer including at least N qubits $q_n$. The circuit includes a set of N−1 layers and an additional layer. The set of N−1 layers sequentially apply N−1 BS gates to the N qubits $q_n$. Each BS gate is a single parameterized 2-qubit gate. Each layer applies a BS gate to two qubits and each subsequent layer applies a BS gate one of the two qubits of the layer and a new qubit. The additional layer is subsequent to the set of N−1 layers and applies an X gate to one of the qubits.

In some embodiments, the new qubit in each subsequent layer is a qubit that the previous layers have not applied a BS gate to.

In some embodiments, the X gate is applied to the new qubit of the N−1$^{th}$ layer.

In some embodiments, the quantum circuit further includes a second set of N−1 layers after the additional layer. The second set of N−1 layers applying N−1 BS gates to the N qubits, where each layer applies a BS gate to two qubits and each subsequent layer applies a BS gate to one of the two qubits of the layer and a new qubit. In some embodiments, the BS gates in the second set of N−1 layers are conjugate gates corresponding to the BS gates in the set of N−1 layers.

Other aspects include components, devices, systems, improvements, methods, processes, applications, computer readable storage mediums, and other technologies related to any of the above.

BRIEF DESCRIPTION OF THE DRAWINGS

The embodiments of the disclosure which we designate as a Clifford loader have other advantages and features which will be more readily apparent from the following detailed description and the claims, when taken in conjunction with the accompanying example drawings, in which:

A Clifford loader is parametrized by a single vector of dimension N so that for each vector x $(x_1, x_2, \ldots, x_N)$ with Euclidean norm 1, there is a corresponding Clifford loader that we designate as C(x).

Figure 1:
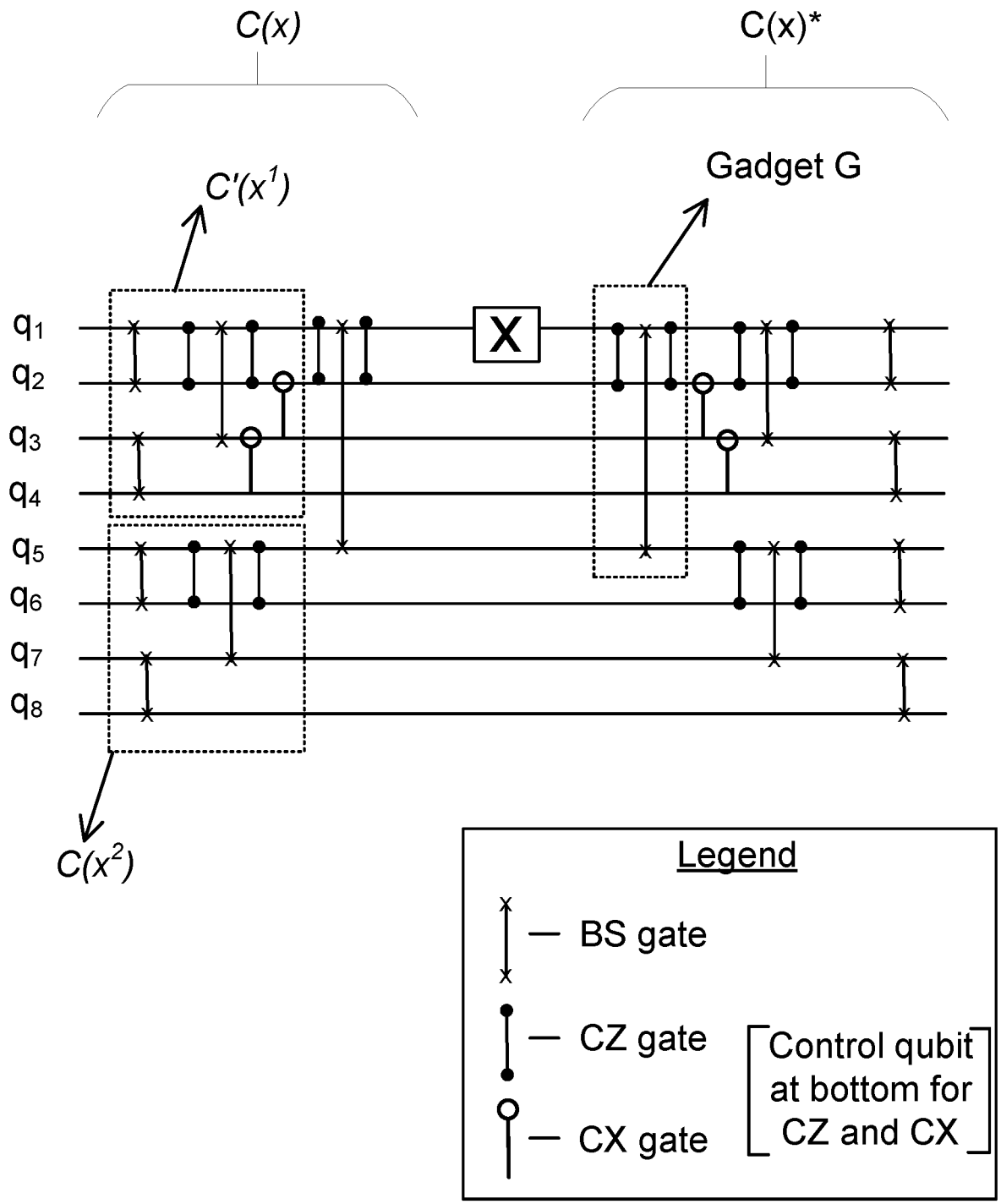
FIG. 1 is a diagram showing a quantum circuit used for implementing a Clifford loader for a given vector of dimension 8, using a single parametrized two-qubit gate (referred to as "BS") and two-qubit controlled X and controlled Z gates, according a first embodiment.

The figures depict various embodiments for purposes of illustration only. One skilled in the art will readily recognize from the following discussion that alternative embodiments of the structures and methods illustrated herein may be employed without departing from the principles described herein. For example, by changing the specifics of the BS gate or by using a different/less optimized methods for parity computations using controlled Z gates.

DETAILED DESCRIPTION OF CERTAIN EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is disclosed.

Part 1: Clifford Loaders

A classical vector is represented by N-dimensional coordinates $(x_1, x_2, \ldots, x_N)$ where $x_1$ is a real number and the Euclidean norm of the vector is 1. For clarity of presentation of this particular aspect, we will assume that N is a power of 2, but our methods can ex-tend to the general case.

For the classical vector x $(x_1, x_2, \ldots, x_N)$, we describe a certain unitary operator in the Clifford algebra, a Clifford loader corresponds to the implementation of this unitary operator.

The Pauli matrices X and Z correspond to single qubit bit flip and phase flip operators and these are anti-commuting matrices with dimension 2. Let $P_i = Z^{i-1} X I^{N-i}$ where the string represents a tensor product of N Pauli operators and the X operator is at position i. The unitary operator implemented by the Clifford loader for vector x acts on N qubits and is given as:

$$C(x) = \sum_{i=1}^{N} x_i P_i \qquad (1)$$

The operator $C$ (x) is unitary for all vectors x with Euclidean norm 1 as it squares to the identity. It belongs to the Clifford algebra as it is a linear combination of the generators $P_i$ of the Clifford algebra for $\mathbb{R}^N$. As a matrix, $C$ (x) has dimensions $2^N \times 2^N$, so $\mathbb{R}$ there is no a-priori reason to expect that it can be implemented as a quantum circuit using a polynomial (in the input size N) number of two-qubit gates. The disclosure provides such an implementation for these circuits, moreover the circuit depth for our implementation is logarithmic in N making these circuits extremely efficient.

We will use one type of parametrized two-qubit gate that we call BS(θ) and has the following description in the standard basis:

$$BS(\theta) = \begin{pmatrix} 1 & 0 & 0 & 0 \\ 0 & \cos(\theta) & \sin(\theta) & 0 \\ 0 & -\sin(\theta) & \cos(\theta) & 0 \\ 0 & 0 & 0 & 1 \end{pmatrix} \qquad (2)$$

Note that one can use other similar gates that are derived by permuting the rows and columns of the above matrix, or by introducing a phase element e^{i*p} instead of the last 1, or by changing the two elements sin(θ) and −sin(θ) to for example i*sin(θ) and i*sin(θ). All these gates are practically equivalent and our method can use any of them. We note that the conjugate of the BS gate is obtained by reversing the angle, that is BS(θ)*=BS(−θ).

We will also use controlled Z and controlled X gates which have the following descriptions in the standard basis:

$$CX_{21} = \begin{pmatrix} 1 & 0 & 0 & 0 \\ 0 & 0 & 0 & 1 \\ 0 & 0 & 1 & 0 \\ 0 & 1 & 0 & 0 \end{pmatrix}, CZ_{21} = \begin{pmatrix} 1 & 0 & 0 & 0 \\ 0 & -1 & 0 & 0 \\ 0 & 0 & 1 & 0 \\ 0 & 0 & 0 & -1 \end{pmatrix} \quad (3)$$

where the second qubit is being used as control qubit for both the gates. Note that an application of the CX gate can be viewed as a parity computation. For example, $CX_{21}|x_1, x_2\rangle = |x_1 \otimes x_2, x_2\rangle$. Parity refers to whether the sum of two numbers (e.g., $x_1$ and $x_2$) is odd or even.

We introduce two matrix identities that can be verified by direct computation on the 4-dimensional matrices given above. These identities describe the effect of conjugating the strings XI and ZZ with the gate BS(B) and are used later to establish the correctness of our constructions.

$$BS(\theta)(XI)BS(\theta)^* = \cos(\theta)XI + \sin(\theta)ZX \quad (4)$$

$$BS(\theta)(ZZ)BS(\theta)^* = ZZ. \quad (5)$$

For the construction of the Clifford loader circuit we need a gadget (a term used for sub-circuits that perform a specific function in circuit complexity theory) that acts on three qubits (in increasing order, say 1, 2 and 3 for convenience) as follows: if qubit 2 is 0 (e.g., on the standard basis) it applies the operation BS(θ) to qubits 1 and 3 and if qubit 2 is 1 (e.g., on the standard basis) it applies the operation BS(θ)* instead. This gadget is denoted as $G_{123}(\theta)$ and can be implemented, for example, using a sequence of three gates $CZ_{21}BS_{13}(\theta)CZ_{21}$ where the CZ gates have qubit 2 as control and the BS(θ) gate acts on qubits 1 and 3. The action of this gadget as described above can be verified by computing the product of the three matrices. In another example, the gadget circuit is implemented by treating the BS(θ) gate not as a single gate but as a sequence of three rotations.

In addition to the gadgets, the Clifford loader includes a sequence of angles that are used as inputs to the BS gates. This sequence of angles is computed from the vector x. The sequence of angles for the two embodiments are described below. Note that the angle sequence for the first embodiment is identical to the sequence described in U.S. patent application Ser. No. 16/986,553, which is incorporated by reference in its entirety. The angle sequence for the second embodiment is specific to this disclosure.

Although the angle sequence for the first embodiment is identical to the sequence described in U.S. patent application Ser. No. 16/986,553, it is briefly described here for completeness. First, we define an auxiliary series $(r_1, r_2, \ldots, r_N)$ of intermediate squared am-plitudes for the vector x. The last N/2 values $(r_{N/2}, r_{N/2+1}, \ldots, r_{N-1})$ are defined as:

$$r_{\frac{N}{2}+j-1} = \sqrt{x_{2j}^2 + x_{2j-1}^2} \quad (6)$$

for index j∈[1, n/2]. The first N/2-1 values are then defined as:

$$r_j = \sqrt{r_{2j+1}^2 + r_{2j}^2} \quad (7)$$

for index j starting at N/2 going down to 1. The last N/2 angles $(\theta_{N/2}, \theta_{N/2+1}, \ldots, \theta_{N-1})$ are defined as:

$$\theta_{\frac{N}{2}+j-1} = \arccos\left(\frac{x_{2j-1}}{r_{\frac{N}{2}+j-1}}\right), \text{ if } x_{2j} \text{ is positive, and} \quad (8)$$

$$\theta_{\frac{N}{2}+j-1} = 2\pi - \arccos\left(\frac{x_{2j-1}}{r_{\frac{N}{2}+j-1}}\right), \text{ if } x_{2j} \text{ is negative,} \quad (9)$$

The first N/2 angles $(r_1, r_2, \ldots, r_{N/2-1})$ are defined as, $$\theta_j = \arccos\left(\frac{r_{2j}}{r_j}\right)$$

for j∈[1, N/2].

The angle sequence for the second embodiment is defined as follows. The first angle is:

$$\theta_1 = \arccos(x_1) \quad (10)$$

and the subsequent angles are defined as, $$\theta_i = \arccos\left(\frac{x_i}{\prod_{1 \leq j < i} \sin(\theta_j)}\right) \quad (11)$$

for 1<i<N.

Similar ways of defining the values of the angles are possible and fall into the same method as ours for both the embodiments. For example, signs for the angles may be flipped or multiples of 7 may be added to the angles.

We can now define two different quantum circuits for implementing the Clifford loader $$C(X) = \sum_{i=1}^{N} x_i P_i$$

for an arbitrary vector $x = (x_1, x_2, \ldots, x_N)$. The first step of the construction is the computation of an angle sequence (as described above). Both of these se-quences can be computed and used as parameters for the Clifford loader circuits. The compu-tational time to determine an angle sequence may be linearly proportional to the dimension of the vector x.

Figure 3A:
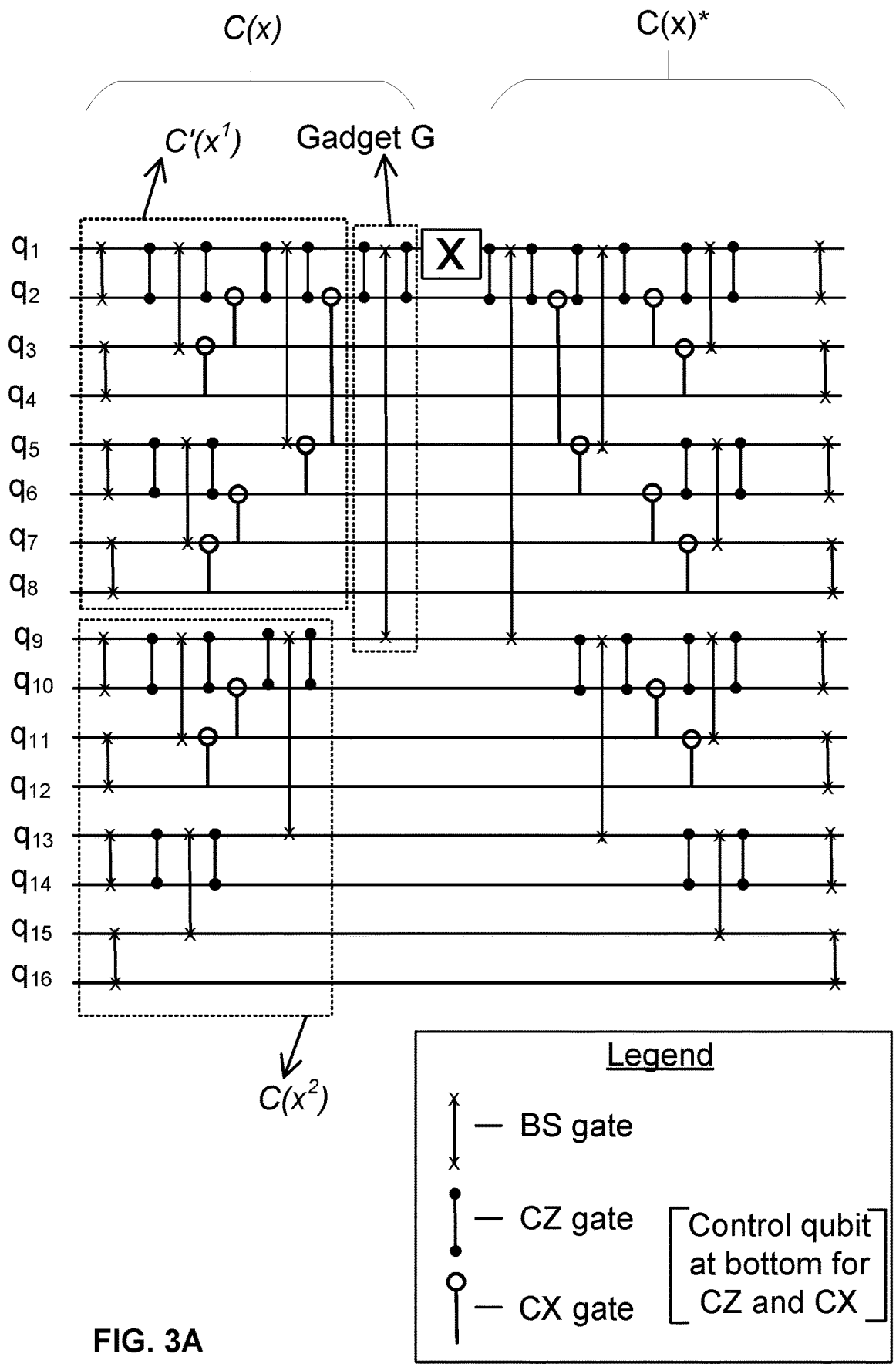
FIGS. 3A and 3B are diagrams showing a quantum circuit used for implementing a Clifford loader for a given vector of dimension 16, using a single parametrized two-qubit gate (referred to as "BS") and two-qubit controlled X and controlled Z gates, according to the first embodiment.
Figure 3B:
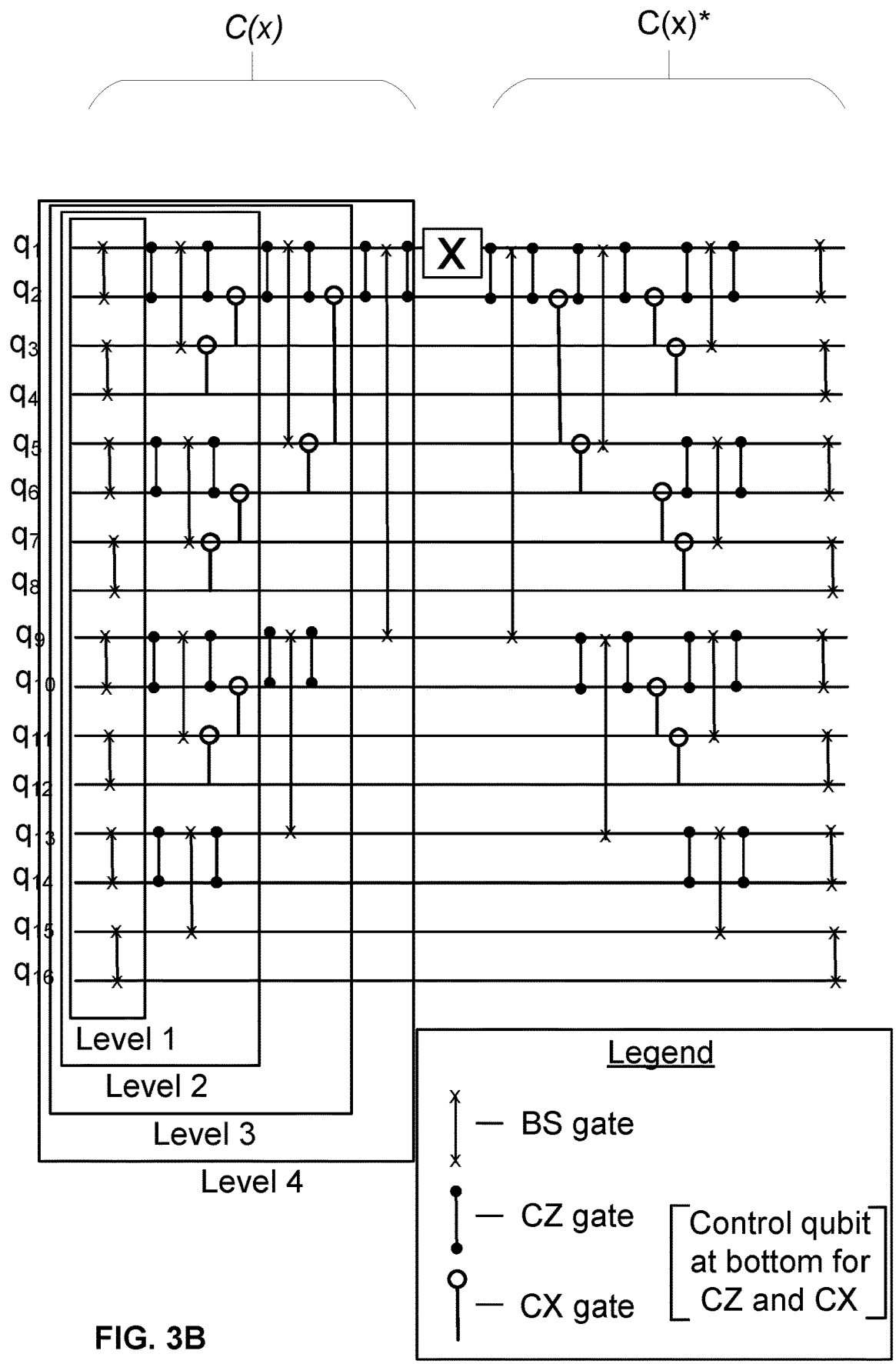

The first embodiment for constructing the Clifford loader is described here, it is illustrated for an 8-dimensional vector in FIG. 1 and for a 16-dimension vector in FIGS. 3A and 3B (FIG. 3B indicates levels of the C(x) circuit). The Clifford loader circuit according to the first embodiment includes an X gate on the first qubit sandwiched between quantum circuit C(x) on the left side and its adjoint (C(x)*) on the right side (where C(x) and C(x)* each have logarithmic depth), that is $C(x) = C(x)(XI^{N-1})C(x)^*$. Recursive descriptions for the C(x) are given below using the gadgets. It is also explicitly shown that the total circuit depth is logarithmic in N. For C(x)*, the gates are reversed and conjugated compared to C(x) (note that CX and CZ are self-conjugate).

We introduce some notation that is used for composing two distinct quantum circuits $S_1$ and $S_2$. In these descriptions we use the notation $(S_1 \| S_2)$ for quantum circuits $S_1$ and $S_2$ being run in parallel on separate sets of qubits and $(S_1, S_2)$ to denote the sequential composition of the circuits on the same set of qubits. Note that a circuit is an ordered collection of one or more gates. For example, a circuit can include only a single gate. A sub-circuit may refer to a circuit that is a part of a larger circuit. We also include an auxiliary circuit that composes the Clifford loader with CX gates. Define C'(x) to be the C(x) followed by a sequence of CX gates so that qubit 2 contains the parity $\otimes_{2 \leq i \leq N} X_i$ of qubits from 2 through N at the end of the computation (e.g., see circuit $C'(x^1)$ in FIG. 1).

We now give an example recursive construction for the circuits C(x) in FIG. 1. As described above, a Clifford loader can be obtained by applying circuits C(x) and C(x)* with an X gate between them. The dimension of vector x (i.e., N) is assumed to be a power of 2. This assumption may be made without loss of generality as we can pad the vector x with some 0 s to make it's dimension a power of 2. For a two dimensional unit vector $x \in \mathbb{R}^2$, the Clifford loader by definition is the circuit $\cos(\theta)XI + \sin(\theta)ZX$, where $\theta = \arccos(x_1)$ so we have $C(x) = C(x') = BS(\theta)$ using the identity in Equation 4. We use this 2-dimensional construction as a base case for our recursive construction, using it to build Clifford loaders for higher dimensional vectors. We next give the recursive definition for C(x) and C'(x) for higher dimensional vectors. Let $x^1$ and $x^2$ be the N/2 dimensional vectors representing the two halves of the vector x, that is $x^1 = (x_1, x_2, \ldots, x_{N/2})$ and $x^2 = (x_{N/2+1}, X_{N/2+2}, \ldots, x_N)$ then the Clifford loader for vector x is constructed using the recursive relations:

$$C(x) = (C'(x^1) \| C(x^2), G_{12(N/2+1)}) \quad (12)$$

$$C'(x) = (C'(x^1) \| C(x^2), G_{12(N/2+1)}, CX(N/2+2, N/2+1), CX(N/2+1, 2)) \quad (13)$$

where $G_{ijk}$ is the three qubit gadget and $CX(i, j) = CX_{ij}$ represents the controlled X gates with the qubit i acting as the control qubit.

The circuit depth for C(x) can be obtained from the recursive relations. Let d(N) be the circuit depth as a function of dimension, then d(2)=1 and from the recursion we have d(N)=d'(N/2)+3 and d'(N)=d'(N/2)+4. Note that the gadget $G_{ijk}$ has depth 3 and CX(N/2+2, N/2+1) can be performed in parallel with the third layer of the gadget $G_{ijk}$ when we implement the circuit using these recursive relations. Thus, the explicit solution for these recurrences is $d(N) = 4(\log_2 N - 1)$ for N power of 2 greater than 2.

We unroll the recursion and give an explicit description of C(x) for 4- and 8-dimensional vectors x. The 4-dimensional C(x) circuit has depth 4*(2−1)=4. It uses angles ($\theta$1, $\theta_2$, $\theta_3$) for the vector x computed according to the first embodiment (as described above) as inputs to the BS gates. We give a gate level description of the 4 layers in the circuit C(x):

Layer 1: $(BS_{12}(\theta_2) BS_{34}(\theta_3))$
Layer 2: $CZ_{21}$
Layer 3: $BS_{13}(\theta_1)$
Layer 4: $CZ_{21}$ The 8-dimensional C(x) circuit will have depth 4*(3−1)=8 as described above. The angles ($\theta_1, \theta_2, \ldots, \theta_7$) for the vector x are computed according to the first embodiment (as described above) and are inputs to the BS gates in C(x). We give a gate level description of all the 8 layers in the circuit C(x), which is illustrated in FIG. 1:

Layer 1: $(BS_{12}(\theta_4) BS_{34}(\theta_5) BS_{56}(\theta_6) BS_{78}(\theta_7))$
Layer 2: $(CZ_{21} \| CZ_{65})$
Layer 3: $((BS_{13}(\theta_2) BS_{57}(\theta_3))$
Layer 4: $(CZ_{21} \| CZ_{65} \| CX_{43} \| CX_{78})$
Layer 5: $(CX_{32} CX_{76})$
Layer 6: $CZ_{21}$
Layer 7: $BS_{15}(\theta_1)$
Layer 8: $CZ_{21}$ Note that layers 2-4 and 6-8 implement the gadget $G_{ijk}$ with some parity computations being carried out in parallel in layer 4. Specifically, the parity computations are represented by the CX gates, the CZ gates are a part of the gadget $G_{ijk}$. Note that the computed angle sequence is used in reverse order if we traverse the circuit C(x) from bottom to top and left to right in FIG. 1.

The second embodiment of the Clifford loader uses the angles sequence described with reference to Equations 10 and 11. Let $(\theta_1, \theta_2, \ldots \theta_{n-1})$ be the angle sequence, then the Clifford loader according to the second embodiment may be realized as $C(x)(XI^{n-1})C(x)^*$ with $$C(x) = (BS_{(n-1)n}(\theta_{n-1}), \ldots, BS_{23}(\theta_2), BS_{12}(\theta_1)) \quad (14)$$

Figure 2:
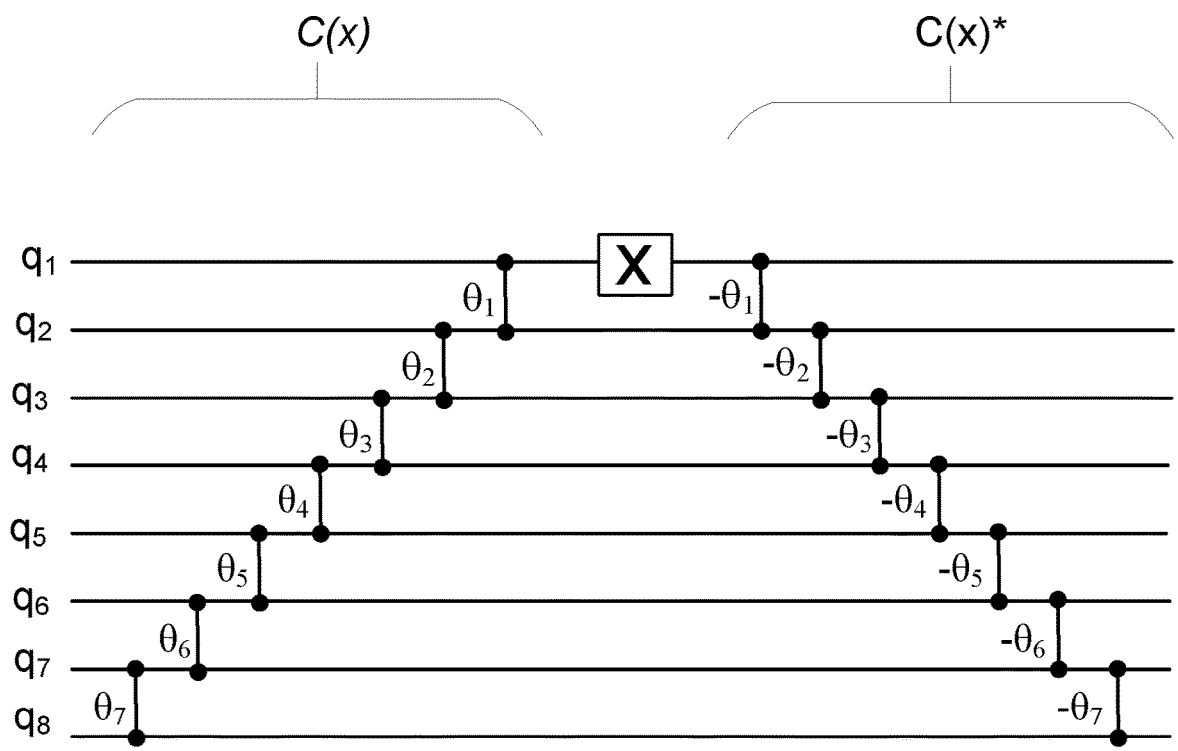
FIG. 2 is a diagram showing a quantum circuit for implementing the Clifford loader for a given vector of dimension 8, the BS gate, according to a second embodiment.
Figure 2:
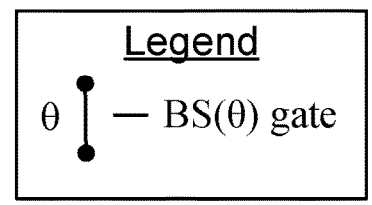

In contrast to the first embodiment, for implementing the Clifford loader C(x) for an n dimensional vector x, it uses (n−1) BS gates in sequence, it has linear circuit depth. An example circuit Clifford loader circuit according to the second embodiment may be seen in FIG. 2.

Part 2: Applications of Clifford Loaders

We now show how to use the Clifford loader to applications in quantum machine learning related to determinant sampling. In particular, we show how to use the Clifford loader to solve the fundamental problem of sampling according to determinant distri-butions and its application to representative feature selection.

Determinant sampling with classical computers is computationally expensive as the complexity of computing the determinant of a single d dimensional matrix scales as $O(d^3)$. In theory, there are complex theoretical constructions which can achieve $O(d^{2.37})$ for computing a single determinant but these can only outperform the standard method for very large d due to their large constant factor overheads. Moreover, most classical determinant sampling algorithms need to compute several determinants leading to even higher computa-tional requirements. In contrast, the quantum algorithm described in this disclosure has complexity O(dlogN).

The input to the determinant sampling problem is a matrix $A \in \mathbb{R}^{N \times d}$ this is a matrix including n row vectors, each having dimension d. The output is a subset $S \subset [N]$ with $|S|=d$ such that the probability of selecting S is proportional to the squared volume of the parallelepiped spanned by the vectors in S. More formally, $$Pr[S] = \frac{\det(A_S)^2}{\det(AA^T)}, \quad (15)$$

where $A_s$ denotes the d×d matrix obtained by selecting the rows of A that belong to S. It is clear that all the probabilities are positive, the sum of the probabilities over all possible S is 1 by the Cauchy Binet identities.

The output of the determinant sampler is a set S including of d 'nearly orthogonal' vectors, as the determinant is maximized when the vectors are orthogonal and is small if any of the vectors is a linear combination of the other vectors. The row vectors in the output of the determinant sampler are guaranteed not to have any linear dependence among them, as $\det(X_s)=0$, if there is a linear dependence then and in this case S will not appear in the output of the sampler. The output of the determinant sampler is a set of diverse and representative vectors. This may be useful for machine learning applications where the goal is to sample a set of representative features.

As an example use case, consider a large dataset of users and features associated with the users, where the goal is to select a set of users with representative and diverse features. Determinant sampling selects a group of users that are diverse and representative of the dataset. It is a technique to obtain a succinct summary of a large dataset that retains all the different groups of users present in it.

The output of the determinant sampler can also be used for low rank approxima-tion by row selection and as an input to clustering algorithms, which have been found to improve upon standard methods.

The following describes a method to perform determinant sampling using a combination of Clifford loaders. Recall from part 1 that the Clifford loader C(x)=

$$\mathcal{C}(x) = \sum_i x_i Z^{i-1} X I^{N-i}$$

is a unitary operator defined for every N dimensional vector x. Further, with respect to the first embodiment, we provided implementations for the Clifford loader using O(Nlog N) two qubit gates and with a circuit depth of O(log N).

The determinant sampling algorithm using Clifford loaders is the following. Let $(a^1, a^2, \ldots, a^d)$ be the columns of the matrix $A \in \mathbb{R}^{N \times d}$. Apply the quantum circuit, $$\mathcal{C}_{(a^1)} \mathcal{C}_{(a^2)} \mathcal{C}_{(a^3)} \mathcal{C}_{(a^d)} |0^N\rangle \quad (16)$$

and measure the resulting state in the standard basis. The result of these operations is a quantum superposition over bit strings where the amplitude of a bit string with d ones and (N-d) zeros is the determinant $\det(A_s)$. Measuring in the standard basis therefore samples from the determinant distribution with $$Pr[S] = \frac{\det(A_S)^2}{\det(AA^T)}.$$

The quantum algorithm measures in the standard basis to obtain an N-bit output string. Let S be the set of ones in the output string, if |S|=d, then it outputs S.

The above procedure uses N qubits and has circuit depth O(dlogN) using the first embodiment in part 1 to apply sequentially d Clifford loader circuits in succession. The procedure succeeds with probability 1 if the columns of the matrix A are orthogonal. More generally the success probability is $\det(A^T A)$.

If the procedure described above with reference to Eqn. 16 succeeds, the output S is a sample according to the determinant distribution. That is, the procedure is correct and solves exactly the determinant sampling problem in time O(dlogN).

The success probability for the determinant sampler may be improved by multi-plying the matrix A by a random sign matrix or a Hadamard matrix before and running the determinant sampler for A'=AH. Using the state-of-the-art procedures for multiplication by a Hadamard matrix, such pre-processing can be carried out in time linear in the number of non-zero entries of A.

For the case when A is an orthogonal matrix, the quantum determinant sampling algorithm with running time O(dlogN) provides a speedup over the best known classical algorithm with running time $O(d^3)$.

More generally, the sequence of Clifford loader operations $\mathcal{C}(a^1)\mathcal{C}(a^2)\mathcal{C}(a^3) \ldots \mathcal{C}(a^d)|0^N\rangle$ provides a representation of the k-dimensional subspace spanned by the vectors $(a_1, a_2, \ldots, a^d)$. Again the success probability of getting this representation is higher if the vectors are orthonormal. This makes the Clifford loader useful for finding projections onto linear subspaces for low dimensional subspaces.

The Clifford loader may also be useful in quantum topological data analysis where $\mathcal{C}$ $$\left(\frac{1}{\sqrt{N}}, \frac{1}{\sqrt{N}}, \ldots, \frac{1}{\sqrt{N}}\right)$$

can be used to generate block encodings for Dirac operators of sim-plicial complexes.

While part 2 is described with reference to the first embodiment of the Clifford loader, the second embodiment of the Clifford load may alternatively be used. In these cases, the running time will be O(dN).

Additional Considerations

Quantum processing devices (also referred to as quantum computers) exploit the laws of quantum mechanics in order to perform computations. Quantum processing devices commonly use so-called qubits, or quantum bits. While a classical bit always has a value of either 0 or 1, a qubit is a quantum mechanical system that can have a value of 0, 1, or a superposition $\alpha|0\rangle + \beta|1\rangle$ of both values, where $\alpha, \beta \in \mathbb{C}$ and $|\alpha|^2 + |\beta|^2 = 1$. Examples physi-cal implementations of qubits include superconducting qubits, ion traps, and photonics systems (e.g., photons in waveguides).

A quantum circuit is an ordered collection of one or more gates. A sub-circuit may refer to a circuit that is a part of a larger circuit. A gate represents a unitary operation performed on one or more qubits. A quantum computer may use a universal set of 1 and 2 qubit gates, by universal it is meant that an arbitrary quantum circuit can be written as a combination of these gates. Quantum gates may be described using unitary matrices. The depth of a quantum circuit is the least number of steps needed to execute the circuit on a quantum computer. A layer of a quantum circuit may refer to a step of the circuit.

Instructions for executing a quantum circuit on one or more quantum computers may be stored in a non-transitory computer-readable storage medium. The term "computer-readable storage medium" should be taken to include a single medium or multiple media (e.g., a centralized or distributed database, or associated caches and servers) able to store instructions. The term "computer-readable medium" shall also be taken to include any medium that is capable of storing instructions for execution by the quantum computer and that cause the quantum computer to perform any one or more of the methodologies disclosed herein. The term "computer-readable medium" includes, but is not limited to, data repositories in the form of solid-state memories, optical media, and magnetic media.

The approaches described above may be amenable to a cloud quantum computing system, where quantum computing is provided as a shared service to separate users. One example is described in patent application Ser. No. 15/446, 973, "Quantum Computing as a Service," which is incorporated herein by reference.

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their deriva-tives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternative embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and gen-erating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented program-ming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A non-transitory computer-readable storage medium comprising stored instructions to execute a quantum circuit by a quantum computer, the quantum computer comprising at least N qubits $q_n$, where n has an integer value from 1 to N, the stored instructions, when executed by the quantum computer, cause the quantum computer to perform operations comprising:

executing a first sub-circuit comprising quantum gates that are applied to N/2 qubits $q_1$-$q_{N/2}$, wherein, subsequent to execution of the first sub-circuit, a value of qubit $q_2$ represents a parity of qubits $q_2$-$q_{N/2}$;

executing a second sub-circuit concurrently to the first sub-circuit, the second sub-circuit comprising quantum gates that are applied to N/2 qubits $q_{(N/2+1)}$-$q_N$; and executing a gadget circuit after the first and second sub-circuits, the gadget circuit comprising quantum gates that are applied to qubits $q_1$, $q_2$, and $q_{(N/2+1)}$, wherein one of the quantum gates of the gadget circuit is a BS(θ) gate, the BS(θ) gate being a single parameterized 2-qubit quantum gate, wherein:

if the value of qubit $q_2$ is 0, the BS(θ) gate is applied to qubits $q_1$ and $q_{(N/2+1)}$, and if the value of qubit $q_2$ is 1, a conjugate of the BS(θ) gate is applied to qubits $q_1$ and $q_{(N/2+1)}$.

2. The non-transitory computer-readable storage medium of claim 1, wherein executing the first sub-circuit comprises:

executing a third sub-circuit comprising quantum gates that are applied to N/4 qubits $q_1$-$q_{N/4}$, wherein, subsequent to execution of the third sub-circuit, the value of qubit $q_2$ represents a parity of qubits $q_2$-$q_{N/4}$;

executing a fourth sub-circuit concurrently to the third sub-circuit and comprising quantum gates that are applied to N/4 qubits $q_{(N/4+1)}$-$q_{N/2}$; and executing a second gadget circuit after the third and fourth sub-circuits, the second gadget circuit comprising quantum gates that are applied to qubits $q_1$, $q_2$, and $q_{(N/4+1)}$, wherein one of the quantum gates of the second gadget circuit is a second BS(θ) gate, wherein:

if the value of qubit $q_2$ is 0, the second BS(θ) gate is applied to qubits $q_1$ and $q_{(N/4+1)}$, and if the value of qubit $q_2$ is 1, a conjugate of the second BS(θ) gate is applied to qubits $q_1$ and $q_{(N/4+1)}$.

3. The non-transitory computer-readable storage medium of claim 1, wherein the operations further comprise executing an X gate applied to qubit $q_1$ after the gadget circuit.

4. The non-transitory computer-readable storage medium of claim 3, wherein the operations further comprise:

executing a second gadget circuit after the X gate, the second gadget circuit comprising quantum gates that are applied to qubits $q_1$, $q_2$, and $q_{(N/2+1)}$, wherein one of the quantum gates of the second gadget circuit is a second BS(θ) gate, wherein:
if the value of qubit $q_2$ is 0, a conjugate of the BS(θ) gate is applied to qubits $q_1$ and $q_{(N/2+1)}$, and
if the value of qubit $q_2$ is 1, the BS(θ) gate is applied to qubits $q_1$ and $q_{(N/2+1)}$.

5. The non-transitory computer-readable storage medium of claim 4, wherein the operations further comprise:
executing a third sub-circuit after the second gadget circuit, the third sub-circuit comprising quantum gates that are applied to N/2 qubits $q_1$-$q_{N/2}$, wherein the quantum gates of the third sub-circuit match the quantum gates of the first sub-circuit except the quantum gates of the third sub-circuit are arranged in reverse order and the BS(θ) gates of the third sub-circuit are conjugated.

6. The non-transitory computer-readable storage medium of claim 5, wherein the operations further comprise:
executing a fourth sub-circuit concurrently to the third sub-circuit, the fourth sub-circuit comprising quantum gates that are applied to N/2 qubits $q_{(N/2+1)}$-$q_N$, wherein the quantum gates of the fourth sub-circuit match the quantum gates of the second sub-circuit except the quantum gates of the fourth sub-circuit are arranged in reverse order and the BS(θ) gates of the fourth sub-circuit are conjugated.

7. The non-transitory computer-readable storage medium of claim 1, wherein executing the first sub-circuit comprises:
executing a first layer that applies a second BS(θ) gate to qubits $q_1$ and $q_2$ and a third BS(θ) gate to qubits $q_3$ and $q_4$;
executing a second layer that applies a first controlled Z gate (CZ gate) to qubits $q_1$ and $q_2$;
executing a third layer that applies a fourth BS(θ) gate to qubits $q_1$ and $q_3$;
executing a fourth layer that applies a second CZ gate to qubits $q_1$ and $q_2$ and a first controlled X gate (CX gate) to qubits $q_3$ and $q_4$; and
executing a fifth layer that applies a second CX gate to qubits $q_2$ and $q_3$.

8. The non-transitory computer-readable storage medium of claim 1, wherein executing the gadget circuit comprises:
executing a first layer that applies a first controlled Z gate (CZ gate) to qubits $q_1$ and $q_2$;
executing a second layer that applies the BS(θ) gate to qubits $q_1$ and $q_{(N/2+1)}$; and
executing a third layer that applies a second CZ gate to qubits $q_1$ and $q_2$.

9. The non-transitory computer-readable storage medium of claim 1, wherein the conjugate of the BS(θ) gate is BS(-θ).

10. The non-transitory computer-readable storage medium of claim 1, wherein the BS(θ) gate has the form:
BS(θ)=[[1, 0, 0, 0], [0, cos(θ), sin(θ), 0], [0, -sin(θ), cos(θ), 0], [0, 0, 0, 1]].

11. A method for executing a quantum circuit by a quantum computer, the quantum computer comprising at least N qubits $q_n$, where n has an integer value from 1 to N, the method comprising:
executing, by the quantum computer, a first sub-circuit comprising quantum gates that are applied to N/2 qubits $q_1$-$q_{N/2}$, wherein, subsequent to execution of the first sub-circuit, a value of qubit $q_2$ represents a parity of qubits $q_2$-$q_{N/2}$;

executing, by the quantum computer, a second sub-circuit concurrently to the first sub-circuit, the second sub-circuit comprising quantum gates that are applied to N/2 qubits $q_{(N/2+1)}$-$q_N$; and
executing, by the quantum computer, a gadget circuit after the first and second sub-circuits, the gadget circuit comprising quantum gates that are applied to qubits $q_1$, $q_2$, and $q_{(N/2+1)}$, wherein one of the quantum gates of the gadget circuit is a BS(θ) gate, the BS(θ) gate being a single parameterized 2-qubit quantum gate, wherein:
if the value of qubit $q_2$ is 0, a BS(θ) gate is applied to qubits $q_1$ and $q_{(N/2+1)}$, the BS(θ) gate being a single parameterized 2-qubit gate, and
if the value of qubit $q_2$ is 1, a conjugate of the BS(θ) gate is applied to qubits $q_1$ and $q_{(N/2+1)}$.

12. The method of claim 11, wherein executing the first sub-circuit comprises:
executing a third sub-circuit comprising quantum gates that are applied to N/4 qubits $q_1$-$q_{N/4}$, wherein, subsequent to execution of the third sub-circuit, the value of qubit $q_2$ represents a parity of qubits $q_2$-$q_{N/4}$;
executing a fourth sub-circuit concurrently to the third sub-circuit and comprising quantum gates that are applied to N/4 qubits $q_{(N/4+1)}$-$q_{N/2}$; and
executing a second gadget circuit after the third and fourth sub-circuits, the second gadget circuit comprising quantum gates that are applied to qubits $q_1$, $q_2$, and $q_{(N/4+1)}$, wherein one of the quantum gates of the second gadget circuit is a second BS(θ) gate, wherein:
if the value of qubit $q_2$ is 0, the second BS(θ) gate is applied to qubits $q_1$ and $q_{(N/4+1)}$, and
if the value of qubit $q_2$ is 1, a conjugate of the second BS(θ) gate is applied to qubits $q_1$ and $q_{(N/4+1)}$.

13. The method of claim 11, further comprising executing an X gate applied to qubit $q_1$ after the gadget circuit.

14. The method of claim 13, further comprising:
executing a second gadget circuit after the X gate, the second gadget circuit comprising quantum gates that are applied to qubits $q_1$, $q_2$, and $q_{(N/2+1)}$, wherein one of the quantum gates of the second gadget circuit is a second BS(θ) gate, wherein:
if the value of qubit $q_2$ is 0, a conjugate of the BS(θ) gate is applied to qubits $q_1$ and $q_{(N/2+1)}$, and
if the value of qubit $q_2$ is 1, the BS(θ) gate is applied to qubits $q_1$ and $q_{(N/2+1)}$.

15. The method of claim 14, further comprising:
executing a third sub-circuit after the second gadget circuit, the third sub-circuit comprising quantum gates that are applied to N/2 qubits $q_1$-$q_{N/2}$, wherein the quantum gates of the third sub-circuit match the quantum gates of the first sub-circuit except the quantum gates of the third sub-circuit are arranged in reverse order and the BS(θ) gates of the third sub-circuit are conjugated.

16. The method of claim 15, further comprising:
executing a fourth sub-circuit concurrently to the third sub-circuit, the fourth sub-circuit comprising quantum gates that are applied to N/2 qubits $q_{(N/2+1)}$-$q_N$, wherein the quantum gates of the fourth sub-circuit match the quantum gates of the second sub-circuit except the quantum gates of the fourth sub-circuit are arranged in reverse order and the BS(θ) gates of the fourth sub-circuit are conjugated.

17. The method of claim 11, wherein executing the first sub-circuit comprises:

executing a first layer that applies a second BS(θ) gate to qubits $q_1$ and $q_2$ and a third BS(θ) gate to qubits $q_3$ and $q_4$;

executing a second layer that applies a first controlled Z gate (CZ gate) to qubits $q_1$ and $q_2$;

executing a third layer that applies a fourth BS(θ) gate to qubits $q_1$ and $q_3$;

executing a fourth layer that applies a second CZ gate to qubits $q_1$ and $q_2$ and a first controlled X gate (CX gate) to qubits $q_3$ and $q_4$; and executing a fifth layer that applies a second CX gate to qubits $q_2$ and $q_3$.

18. The method of claim 11, wherein executing the gadget circuit comprises:

executing a first layer that applies a first controlled Z gate (CZ gate) to qubits $q_1$ and $q_2$;

executing a second layer that applies the BS(θ) gate to qubits $q_1$ and $q_{(N/2+1)}$; and executing a third layer that applies a second CZ gate to qubits $q_1$ and $q_2$.

19. The method of claim 11, wherein the conjugate of the BS(θ) gate is BS(-θ).

20. A quantum circuit for execution by a quantum computer, the quantum circuit comprising:

N qubits $q_n$, where n has an integer value from 1 to N, with $N=2^K$ and $K \geq 2$; and K recursive circuit levels k=1 to K, wherein:

each circuit level k comprises ($N/2^k$) level-k circuits, and each level-k circuit comprises one or more quantum gates applied to $2^k$ of the qubits $q_n$, the $2^k$ qubits for each level-k circuit comprising a first qubit and a second qubit for that level-k circuit;

each level-1 circuit comprises a BS(θ) gate applied to two of the qubits $q_n$, the BS(θ) gate being a single parameterized 2-qubit quantum gate, where one of the two qubits is the first qubit of the level-1 circuit and the other of the two qubits is the second qubit of the level-1 circuit; and each level-k circuit for k≥2 comprises:

one of the level-(k-1) circuits as a first sub-circuit and another of the level-(k-1) circuits as a second sub-circuit; and a gadget circuit comprising a BS(θ) gate, wherein:

if the value of the second qubit of the first sub-circuit is 0, the BS(θ) gate is applied to the first qubit of the first sub-circuit and the first qubit of the second sub-circuit; and if the value of the second qubit of the first sub-circuit is 1, a conjugate of the BS(θ) gate is applied to the first qubit of the first sub-circuit and the first qubit of the second sub-circuit.

* * * * *